(12) United States Patent
Mueller et al.

(10) Patent No.: US 7,711,474 B2
(45) Date of Patent: May 4, 2010

(54) METHOD FOR THE AUTOMATIC CALCULATION OF OPTIMUM ROUTES

(75) Inventors: Guido Mueller, Quedlinburg (DE); Holger Hoeling, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/489,486

(22) PCT Filed: Aug. 16, 2002

(86) PCT No.: PCT/DE02/02997

§ 371 (c)(1),
(2), (4) Date: Oct. 4, 2004

(87) PCT Pub. No.: WO03/027612

PCT Pub. Date: Apr. 3, 2003

(65) Prior Publication Data

US 2005/0065717 A1 Mar. 24, 2005

(30) Foreign Application Priority Data

Sep. 14, 2001 (DE) .................. 101 45 299

(51) Int. Cl.
*G01C 21/30* (2006.01)
(52) U.S. Cl. .............. 701/201; 701/208; 701/209
(58) Field of Classification Search ............... 701/201, 701/202, 206, 208, 209, 210
See application file for complete search history.

(56) References Cited

U.S. PATENT DOCUMENTS

| | | | |
|---|---|---|---|
| 5,983,158 A * | 11/1999 | Suzuki et al. | 701/209 |
| 6,047,235 A * | 4/2000 | Hiyokawa et al. | 701/201 |
| 6,192,314 B1 * | 2/2001 | Khavakh et al. | 701/209 |
| 6,256,579 B1 * | 7/2001 | Tanimoto | 701/201 |
| 6,263,278 B1 * | 7/2001 | Nikiel et al. | 701/210 |
| 6,266,613 B1 * | 7/2001 | Nimura et al. | 701/210 |
| 6,470,267 B1 * | 10/2002 | Nozaki | 701/209 |
| 6,510,384 B2 * | 1/2003 | Okano | 701/209 |
| 6,567,743 B1 * | 5/2003 | Mueller et al. | 701/209 |
| 6,622,087 B2 * | 9/2003 | Anderson | 701/209 |

(Continued)

FOREIGN PATENT DOCUMENTS

DE 199 28 295 12/2000

OTHER PUBLICATIONS

Kirson A.M., "Route Planning System With User Selectable Preferences", Motorola Technical Devements, Motorola Inc., Jul. 1, 1991, pp. 58-59.

*Primary Examiner*—Khoi Tran
*Assistant Examiner*—Brian J Broadhead
(74) *Attorney, Agent, or Firm*—Kenyon & Kenyon LLP (57) ABSTRACT

A method for automatically calculating optimum routes in a traffic-route network is provided, taking into consideration at least one set, fixed route section, where the traffic-route network is described by segments for traffic-route sections, weighted with a resistance, and nodes for the intersection points of traffic-route sections, and the route to be calculated runs from a starting segment to a destination segment, and where, for purposes of optimization, the segments from the destination segment to the starting segment are evaluated with respect to the best resistance. The route is optimized, in each instance, from a starting segment up to the fixed route sections, at the fixed route sections, and from the fixed route section up to a destination segment.

10 Claims, 9 Drawing Sheets

U.S. PATENT DOCUMENTS

| | | |
|---|---|---|
| 6,701,248 B2 * | 3/2004 | Petzold et al. ............... 701/202 |
| 6,813,558 B1 * | 11/2004 | Lapstun et al. ............... 701/202 |
| 2003/0036848 A1 * | 2/2003 | Sheha et al. ................. 701/209 |
| 2004/0049335 A1 * | 3/2004 | Schmidt et al. .............. 701/201 |
| 2004/0148096 A1 * | 7/2004 | Katou ........................ 701/201 |
| 2005/0021228 A1 * | 1/2005 | Choi .......................... 701/209 |
| 2005/0090975 A1 * | 4/2005 | Mueller ...................... 701/209 |
| 2005/0131633 A1 * | 6/2005 | Lapstun et al. ............... 701/202 |

* cited by examiner

METHOD FOR THE AUTOMATIC CALCULATION OF OPTIMUM ROUTES

FIELD OF THE INVENTION

The present invention relates to a method for automatically calculating optimum routes in a traffic-route network, in view of at least one set, fixed route section, the traffic-route network being described by resistance-weighted segments for traffic-route sections and nodes for the intersection points of traffic-route sections, and the route to be calculated running from a starting segment to a destination segment, where, for purposes of optimization, the segments from the destination segment to the starting segment are evaluated for the most favorable resistance.

BACKGROUND INFORMATION

In a conventional navigation system, routes in a traffic-route network are determined between set starting and destination points using optimization.

For mathematical processing, a traffic-route network is represented as a graph having segments k for road sections and nodes p for traffic junctions. The segments represent the roads, and the nodes represent the interconnection points of the road network. Since the traffic flow is directional in the real road network, a segment is described as a directional vector.

The segments are assigned section resistances. The section resistance represents a parameter for the effort in traveling from one node in the traffic-route network to another node. In the simplest case, the segment length can be directly used as the section resistance. As an alternative, the travel time on a segment can also be regarded as its section resistance, assuming a particular traffic speed (slow, medium, fast). However, optimization methods are also known, in which travel time, length, and other variables are linked each other, in order to calculate the section resistance of a segment in a graph.

It is known in the art that the nodes can each be assigned a maneuvering resistance.

An optimum route from a starting point on a starting segment to a destination point on a destination segment is determined by conventional, best-way route calculation algorithms such a that the sum of all the section resistances assigned to the segments of the optimum route is minimized.

A standard algorithm for route optimization is described in Ford, Moore and explained in detail in the following.

The best-way route optimization algorithm is reverse iterating, with all of the segments in the graph of the traffic-route network between the starting segment and the destination segment being visited and evaluated for the most favorable resistance to the destination segment. Starting out from a destination segment, the route most favorable in terms of resistance to the segments, which are specified in a list and optimized in the previous iteration step, is visited here in each iteration step. As a result, the method supplies the optimum route from each segment in the graph to the destination segment. The calculation results are stored in a route table in which the resistance up to the destination segment and the subsequent successor segment in the destination direction is specified for each segment in the graph of the traffic-route network. The resistance of each segment is set to "infinite" and the successor segment is set to "undefined" as initialization values. In each instance, a resistance and a successor segment in the direction of the corresponding segment is stored for each segment, as well as a resistance and a successor segment in the direction opposite to the resistance.

Prior to the start of the iterative optimization, the destination segment is initialized to have a resistance of zero in the route table. In addition, the destination edge is entered into a final list for segments that are already optimized. A further optimization list is needed for storing the segments to be checked in the next optimization steps. This optimization list is empty at the start of the method.

The optimization method is begun after the initialization, all of the segments specified in the final list being considered imaginary, actual positions of a vehicle. All of the incoming segments interconnected with this actual segment are subjected to an optimization test. For the optimization, it is assumed that the vehicle is situated on one of the incoming segments, with the direction of travel towards the actual segment. As an optimization condition, it is then checked if the resistance of the old, available route of the incoming segment is worse than the resistance for the new route of the incoming segment, using the actual segment. If the route through the actual segment turns out to be more optimal, the optimization is accomplished by entering the corresponding, optimum resistances and successor segments for the respective incoming segments.

The condition for optimizing the resistances may be mathematically represented as follows:

$$R_{RT,\ actual\ segment} + R_{segment,\ incoming\ segment} < R_{RT\text{-}old,\ INCOMING\ segment},$$

where $R_{RT,\ actual\ segment}$ is the resistance from the route table, of the considered, actual segment to the destination;

$R_{segment,\ incoming\ segment}$ is the segment resistance of an incoming segment interconnected with the actual segment, and $R_{RT\text{-}old,\ INCOMING\ segment}$ is the resistance from the route table, of the incoming segment interconnected with the actual segment, to the destination.

Optimization takes place when the above-mentioned inequality condition is satisfied, i.e., the new resistance of the incoming segment is less than the old resistance of the incoming segment. The resistance of the incoming segment is replaced in the route table with the new, lesser value. The actual segment is entered in as the successor segment, and the optimized, incoming segment is introduced into the final list.

If all of the segments from the optimization list have been processed, as described, then the optimization list and the final list are interchanged. The basis for the next optimizations are the segments optimized here in the last step. The method is terminated when the final list is found to be empty, i.e., when there are no more segments optimized in the previous run.

In conventional navigation systems, a route to be optimized may be influenced by the user, for example, by

- choosing different optimization criteria, such as a short route, fast route, or avoidance of expressways, etc.;
- controlling road sections manually, or by way of traffic telematics, the road sections then being able to be driven around or favored during the calculation of the optimum route; and
- defining one or more intermediate destinations, which are then approached in order, in order to finally lead to a destination.

Besides defining intermediate destinations, the user has, however, no possibility of presetting a particular section of his route, which necessarily becomes a part of the route between the starting segment and the destination segment. Thus, there is the need, for example, to stipulate a route along tourist streets as a fixed route section, for, in different regions, certain streets are identified as tourist streets, which run along predetermined objects or have other special features. Thus, a wine trail, china street, or avenue, as well as a romantic street, are known, for example, in Germany.

In addition, there is a need to establish external definitions of routes. This is useful, for example, when the user should use particular roads on his way to the destination.

However, the stipulation of a fixed route section to be used should not be completely obligating. In the event of a deviation from the fixed route section, the route calculation unit should lead the driver back to the fixed route section, taking the local conditions into consideration, but it should not lead the driver back by compelling him to turn around (compulsory turning-around).

Conventional navigation systems do not allow route sections to be fixed in advance.

The "TravelPilot DX-N" navigation system allows a user to define a tour, in that the fixed route section is described by intermediate destinations. However, the conventional route-optimization algorithms do not ensure that the fixed route section is universally used. In addition, the route from the current vehicle position to the destination is not calculated in this navigation system.

Therefore, an object of the present invention is to provide an improved method for automatically calculating optimum routes in a traffic-route network, in view of at least one set, fixed route section, where the calculated, optimized route leads through as large a part of the fixed route section as possible and the individual route sections are optimal.

SUMMARY OF THE INVENTION

This object to the present invention is achieved by optimizing the route, in each instance, from the starting segment to the fixed route section, and from the fixed route section to the destination segment.

This may be accomplished by:
a) dividing up the route into two route segments, a first starting route segment (or first route portion) running from the starting segment to approximately the end of the fixed route section, and a second destination route segment (or second route portion) running from approximately the end of the fixed route section to the destination segment;
b) separately optimizing the routes for the starting route segment and for the destination route segment, a route being established as optimal for an incoming segment, which is interconnected, in each instance, with the actual segment to be tested,
  when either the resistance of the route in the specific route segment recently stipulated as being optimal for the incoming segment is less optimal than the resistance of the new route in the specific route segment starting out from the incoming segment, using the actual segment,
  or the resistance of the route in the specific route segment recently established as being optimal for the incoming segment corresponds to the resistance of the new route in the specific route segment starting out from the incoming segment, using the actual segment, and when the total resistance of the route established up to now as being optimal for the incoming segment in relation to the entire route is less optimal than the total resistance of the new overall route starting from the incoming segment, using the actual segment; and
c) determining the optimum segment from the results of the optimization for the starting route segment and the destination route segment.

The separation of the optimization in the starting route segment and in the destination route segment ensures optimum route guidance to the fixed route section and on the fixed route section, and optimum route guidance from the fixed route section to the destination segment.

In addition to the known optimization condition, which is applied, however, so as to be limited to the specific route segment and not to the entire route, optimization also occurs when the new resistance of the incoming segment corresponds to the previous resistance of the incoming segment, based on the specific route segment, and the total resistance of the incoming segment, based on the entire route, is simultaneously more optimal than the previous resistance of the incoming segment for the entire route.

This additional condition results in route guidance through the fixed route section, if possible.

In addition, the method of the present invention has the advantage, that the complete route is available at all times and optimum route guidance is also ensured after a change in or manipulation of the traffic-route network by means of, for example, telematic control or user-defined blocking, or after a deviation from the previous route.

After the starting and destination route segments are optimized, the results of the starting and destination route segments are compiled in the form of a route list for the optimum route.

According to one embodiment, the optimization method according to the invention is executed in the following order:
a) optimizing the route in the destination route segment;
b) optimizing the route in the starting route segment; and
c) determining the optimum segment from the results of the optimization for the starting route segment and the destination route segment.

In this connection, it is taken into account that the optimization method is executed in a reverse-iterating manner and starts out from the destination segment.

For both the starting route segment and the destination route segment, a route table having all possible segments of the traffic-route network is advantageously initialized for the route in the specific route segment. According to the initialization, each segment may have, in each instance, one resistance per direction of a segment, and a subsequent segment number. For the initialization, the resistances are set to an extreme value and the subsequent segments are stipulated as being "undefined". The extremely high resistance (such as infinite) ensures that the above-described, optimization-condition inequality is initially satisfied and all segments are initially updated.

In order to optimize the route in the destination-route segment, the original segments from which the optimization is started are also initialized. To this end, the resistance of the original segments is set to zero in the route table, and the corresponding, successor segment is set to "not available" in the route table. For the destination route segment, the original segments are all segments that belong to a destination.

To optimize the route in the starting route segment, the original segments are initialized in a different manner. The starting segments of the destination route segment having the lowest resistance up to the destination segment are used as the original segment. In each instance, the total resistance of the original segments is set to the value determined for the original segment during the optimization of the destination route segment. The starting route segment-based resistances of all segments of the fixed route section are set to zero. This allows the fixed route section to be considered during the route optimization.

In each instance, the initialization may be carried out at the start of the optimization of the starting route segment and the destination route segment. The specific optimization method is subsequently carried out.

In order to detect the segments belonging to the fixed route section, a status identifier may be provided in the route table for the corresponding segments of the fixed route segment.

During the implementation of the method, it is advantageous to store previously optimized segments in a final list, and to access the final list. A further optimization list may be provided for storing the segments to be checked in the next optimization step which may be empty at the start of the optimization method.

In this connection, the optimization method is iteratively executed for the segments entered in the final list, these entered segments being regarded as actual segments. The incoming segments corresponding to each of these actual segments are optimized. The segments, which are to be checked in the next optimization step and are entered into the optimization list, result from the successor segments of the optimized incoming segments. When the optimization is carried out for all actual segments from the final list, the final list is interchanged with the optimization list. The optimization is ended when the final list remains empty after the exchange of the lists, i.e., when no more segments have been optimized.

DETAILED DESCRIPTION

Figure 1:
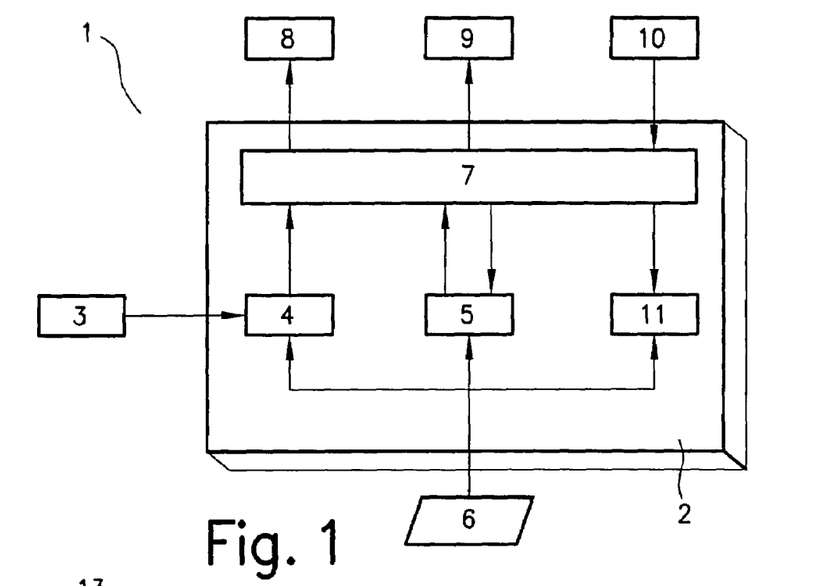
FIG. 1 shows a block diagram of a conventional navigation system for automatically calculating optimum routes in a traffic-route network.

FIG. 1 shows a conventional navigation system 1 having a navigation computer 2 in the form of a block diagram. The position of a vehicle is determined with the aid of suitable sensors 3, such as a global positioning system (GPS) and/or wheel sensors, etc., and is transmitted to navigation computer 2 as a position signal. Navigation computer 2 carries out position-finding 4. The position-finding signal is used for a route search 5. During route search 5, a digital map stored in a mass memory 6 may be accessed. The located position, the route, and, if applicable, further data are transmitted via an interface 7 to a loudspeaker 8, a display unit 9, and/or other output devices. An input unit 10 is provided, in order to operate navigation system 1 and, in particular, to define a starting position and a destination position. Input unit 10 is coupled to route search unit 5 by interface 7.

Specific route sections, which are to be considered in the optimization of a route, may be input via input unit 10 and interface 7. These entries are stored in an index 11, which is coupled to route-search unit 5.

Index 11 and interface 7 are adapted so that a fixed route section may be set.

Using graphically supported, best-way route optimization algorithms, an optimum route from the input destination point to a starting point is calculated by navigation system 1.

Figure 2:
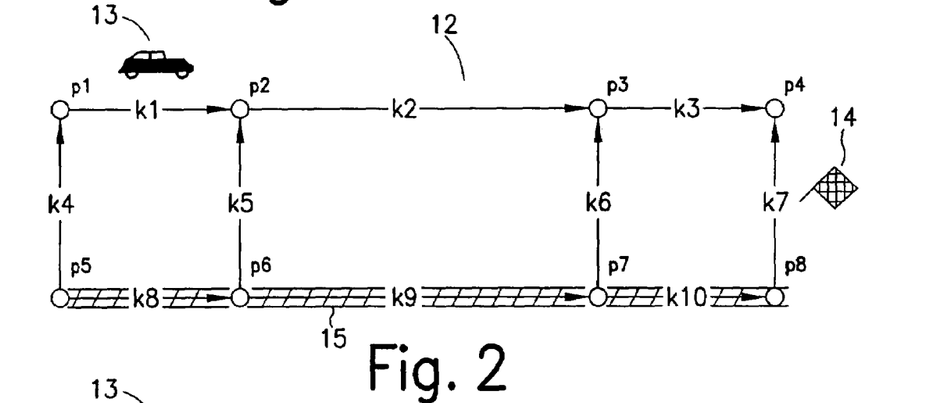
FIG. 2 shows a graphical diagram of a traffic-route network, having a fixed route section.

FIG. 2 shows a traffic-route network 12 in the form of a graphical diagram. The exemplary traffic-route network is made up of segments k1, k2, k3, k4, k5, k6, k7, k8, k9, and k10. The interconnection or intersection points of segments are referred to as nodes p1, p2, p3, p4, p5, p6, p7, and p8. Defined starting point 13 is situated on segment k1 and delineated as the vehicle position. Destination 14 designated by a flag is situated on segment k7. The segments themselves correspond to traffic-route sections or road sections.

A route through segments k8, k9, and k10 was defined by a user as a preferred route, which is subsequently designated as fixed route section 15 and displayed with hatching. Such a fixed route section 15 may run along tourist roads, for example, or may be another preferred route.

Figure 3:
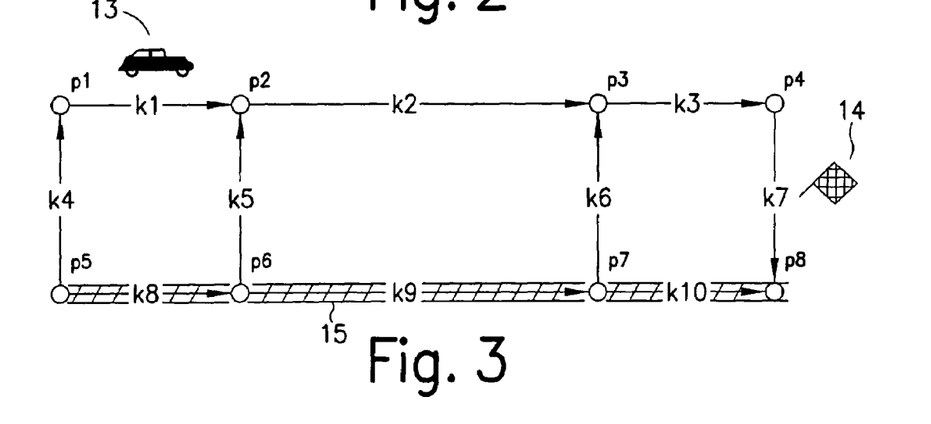
FIG. 3 shows a graphical diagram of the traffic-route network from FIG. 1, having route optimization according to a conventional optimization method.

FIG. 3 shows the graphical diagram from FIG. 2, having an optimized route along segments k1, k2, k3 and k7 from starting point 13 to destination 14, the route having been optimized with the aid of a conventional, best-way route optimization algorithm. Since the conventional, best-way route optimization algorithms are not designed to consider fixed route sections 15, the optimized route does not run through fixed route section 15.

Figure 4:
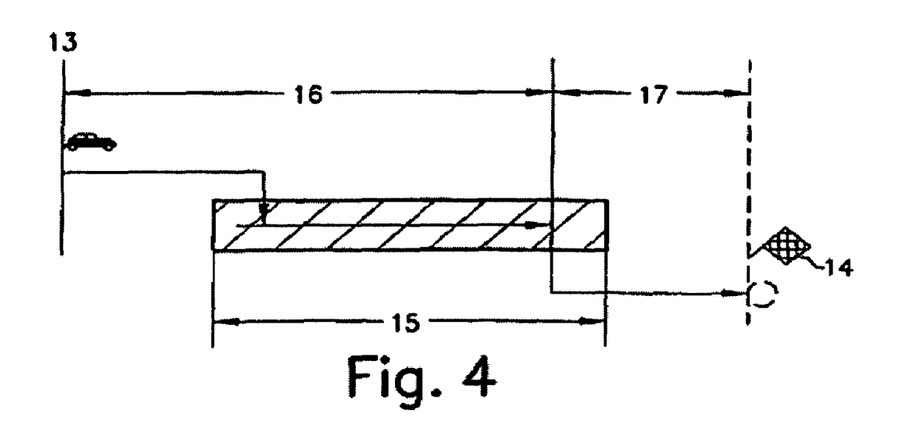
FIG. 4 shows a schematic representation of the division of a route into a starting route segment and a destination route segment.

As sketched in FIG. 4, the division of the routes into two route segments 16 and 17 is provided for the method of the present invention for automatically calculating optimum routes, a first starting route segment 16 running from starting point 13 to approximately the end of fixed route section 15. Second destination route segment 17 runs from the end of starting route segment 16, i.e., from approximately the end of fixed route section 15, to destination 14.

In contrast to conventional, best-way route optimization algorithms, the present invention provides for the route optimization for starting route segment 16 and destination route segment 17 to be accomplished separately.

Figure 5:
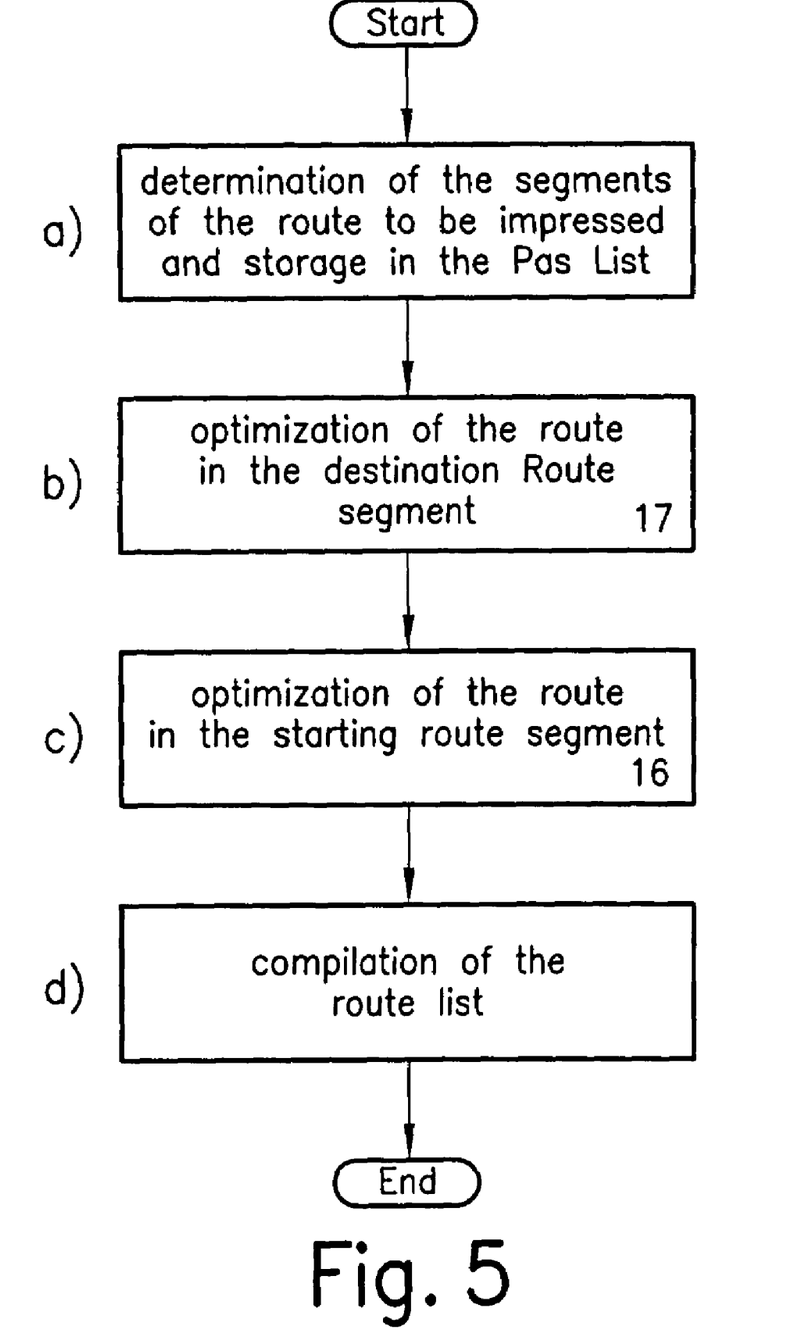
FIG. 5 shows an example flowchart of the method of the present invention for automatically calculating optimum routes.

FIG. 5 shows an example flowchart of the method of the present invention for automatically calculating optimum routes, the separate route calculation for the two route segments 16 and 17 indicated in the flowchart.

After the start of an automatic calculation of an optimum route in a traffic-route network, the segments of the route section 15 to be fixed are initially determined, e.g., via index 11, and stored in a passing list PassList in a first step a).

The optimization of the route in destination route segment 17 then occurs in a second step b). The optimization of the route in starting route segment 16 in a third step c) only occurs after an optimum route has been determined for destination route segment 17.

In a fourth step d), a final route list is compiled from the optimum routes from the second and third steps of the method after completion of the route optimization in starting route segment 16, and the automatic calculation method for an optimum route is ended.

Figure 6:
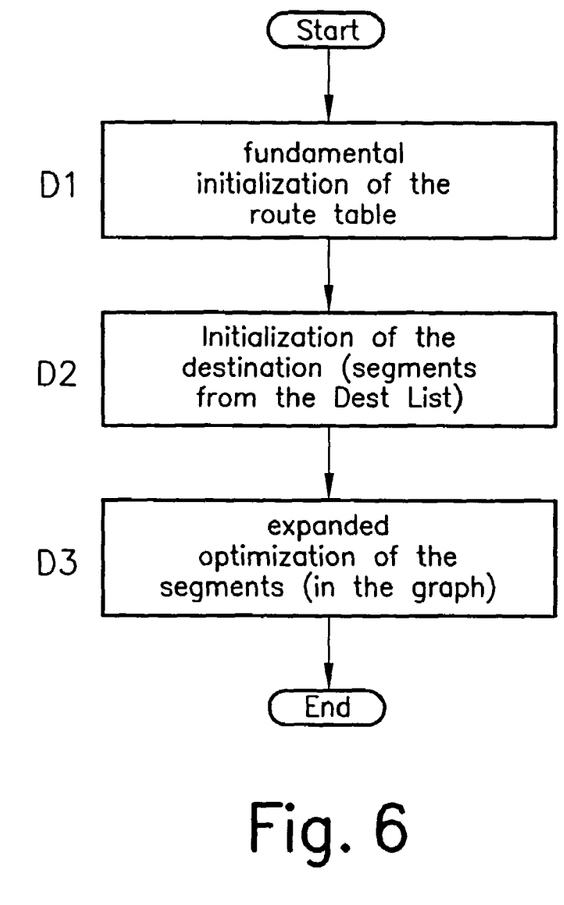
FIG. 6 shows an example flowchart of the method for optimizing the route in the destination route segment.

FIG. 6 shows an example flowchart for optimizing the route in destination route segment 17. After the start of the procedure, a route table is first initialized. In this connection, the resistances of the segments are set to a value of "infinite". The specific successors for the resistances are set to "undefined" (−) (step D1).

The segments from a destination list (DestList) are initialized in a second step D2. These are the segments belonging to destination 14. The resistance of these segments is set to zero, while corresponding successors are set to not available (NIL).

An optimization of the segments, which is expanded beyond the known, best-way route optimization algorithms and based on the graph theory, is performed in step D3, the graph theory being subsequently explained in detail. The partial method is concluded after the segments for the route in starting route segment 16 are optimized.

Figure 7:
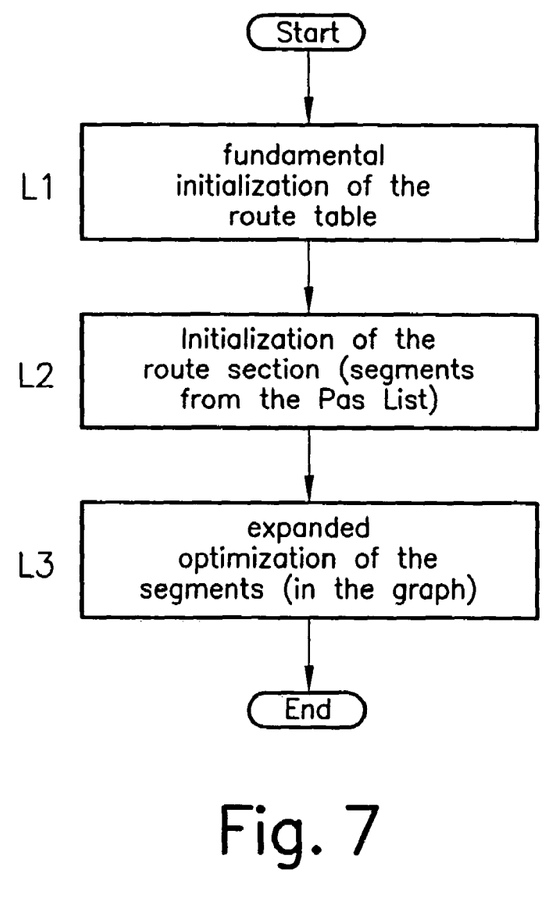
FIG. 7 shows an example flowchart of the method for optimizing the route in the starting route segment.

FIG. 7 shows the corresponding method of third step c) for optimizing the route in starting route segment 16.

In first step L1, the route table is initialized again, all of the segments belonging to starting route segment 16 being input into the route table, and the corresponding resistances are set to "infinite". The specific successors of the resistances are set to "undefined" (−). The starting route segment is initialized in a second step L2, and the segments from passing list (PassList) are designated as such in the route table. Since the optimization method is carried out in a known, reverse-iterating manner, the segments from which the optimization starts are initialized. For starting route segment 16, these are the segments of fixed route section 15 having the lowest resistance to destination 14 of destination route segment 17.

For these segments, the resistance previously determined during the optimization of the route in destination route segment 17 is entered in the route table, and the successor is appropriately designated. In addition, the resistance for all of the segments of fixed route section 15 is set to zero.

An expanded optimization of the segments then occurs in third step L3. This method corresponds to step D3 during the optimization of the route in the destination route segment.

Figure 8:
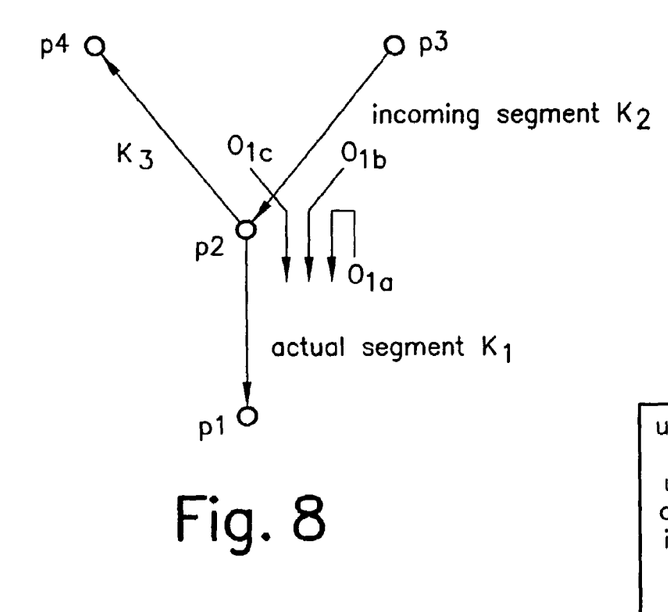
FIG. 8 shows a graphical diagram for optimizing a considered, actual segment having two incoming segments interconnected with it.

The expanded optimization method of the segments in the rearwardly directed, iterative method is explained in detail in the following with reference to FIG. 8, which shows optimization relationships of segments k1 through k3 at nodes p1 through p4. Starting out from an actual segment k1, which represents an imaginary vehicle position, all of the so-called incoming segment(s) interconnected with actual segment k1 are checked. In the example shown, actual segment k1 is directed at destination 14. Incoming segments k2 and k3 abut against actual segment k1 at a node p2.

Optimization relationships 01A, 01B und 01C are checked for the optimization. Optimization relationship 01A represents turning around at node p2 of actual segment k1 and takes the positive and negative resistance of actual segment k1 into consideration.

Optimization condition 01B considers the resistances of incoming segment k2 in the positive direction and the positive resistance of actual segment k1 in the direction of destination 14.

Optimization relationship 01C considers the negative resistance of incoming segment k3 (in the direction opposite to the arrow), as well as the positive resistance of actual segment k1.

Starting out from the considered destination segments of specific route segment 16 or 17, the starting segments of the course of the partial route optimized in the previous optimization step are each used as actual segments in the rearwardly directed, iterating optimization method.

Figure 9:
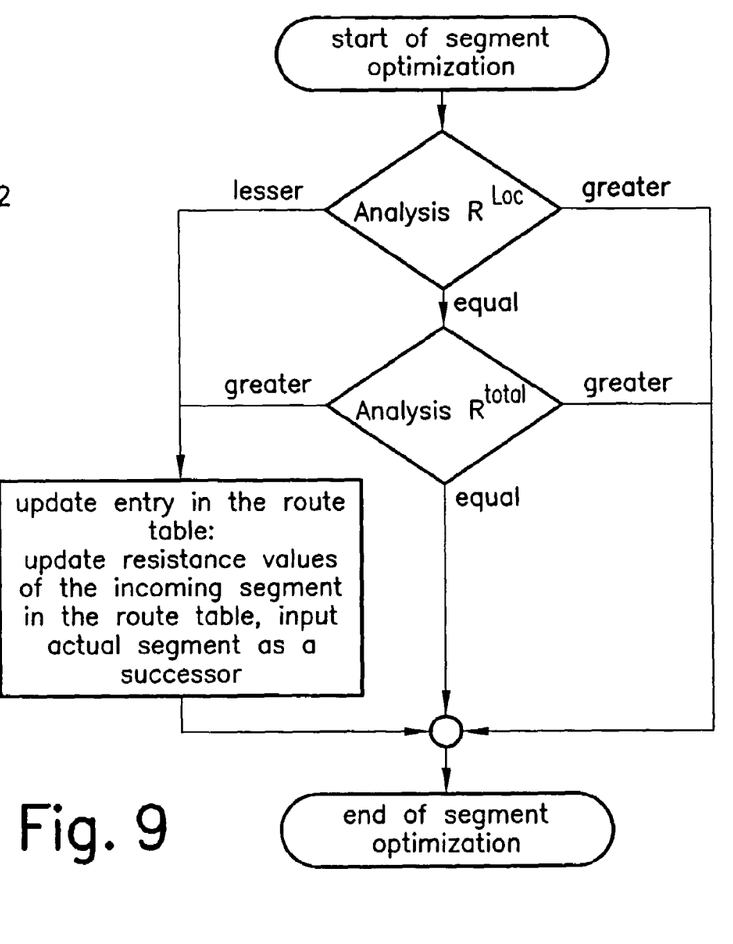
FIG. 9 shows an example flowchart of the checking of the optimization conditions.

FIG. 9 shows an example flowchart of the optimization rule of the present invention, according to which a segment within a route is established as being optimal. The optimization method is used in the same way in steps D3 and L3 for optimizing the route in destination route segment 17 and starting route segment 16.

For each incoming segment, it is first checked if resistance $R^{seg}_{RT, \, actual}$ of the actual segment, entered in the route table, based on the corresponding route segment, plus resistance $R_{segment, \, incoming}$ of the incoming segment is less than old resistance $R_{RT-old, \, incoming}$ of the incoming segment to the destination, entered in the route table, in specific route segment Seg, i.e., if $$R^{seg}_{RT, \, actual} + R_{segment, \, incoming} < R^{seg}_{RT-old, \, incoming}.$$

When this sufficient condition is satisfied, the entry for the corresponding incoming segment is updated in the route table, in that the resistance values of the incoming segment are entered in the route table and the actual segment is entered as a successor.

In the case in which the old, route-segment-based resistance of the incoming segment entered in the route table is greater than the sum of the resistance of the actual segment for the route segment, entered in the route table, plus the resistance of the incoming segment, the segment optimization for the is checked, and the incoming segment is ended.

In the case of an equality, a further analysis of the total resistances is conducted, which is based on the entire traffic-route network, regardless of the division into starting and destination route segments 16, 17. In this connection, it is checked if the total resistance of the actual segment entered in the route table, plus the resistance of the incoming segment, is less than the total, incoming-segment resistance to destination 14 previously entered in the route table. If this condition is satisfied, the entry in the route table is updated, as described above, in that the resistance values of the incoming segment, as well as the actual segment, are entered in the route table as successors.

The condition for analyzing the total resistance may be mathematically represented as follows:

$$(R^{seg}_{RT, \, actual} + R_{segment, \, incoming} = R^{Seg}_{RT-old, \, incoming}) \cap$$
$$(R^{total}_{RT, \, actual} + R_{segment, \, incoming} < R^{total}_{RT-old, \, incoming})$$

where $R^{seg}_{RT, \, actual}$: is the resistance of the actual segment to the destination in specific route segment Seg, from the route table, $R_{segment, \, incoming}$: is the segment resistance of the incoming segment, $R^{Seg}_{RT\text{-}old, incoming}$: is the resistance of the incoming segment to the destination in specific route segment Seg, from the route table, $R^{total}_{RT, actual}$: is the resistance of the actual segment to absolute destination 14 from the route table, and $R^{total}_{RT\text{-}old, incoming}$: is the resistance of the incoming segment to absolute destination 14 from the route table.

Therefore, the checked incoming segment is optimized, if one of the two above-mentioned conditions for analyzing the resistance, based on segments $R^{Seg}$ or total resistance $R^{total}$, is fulfilled. The new characteristics of the incoming segment are then entered into the route table, and the specific actual segment is entered as a successor.

Figure 10:
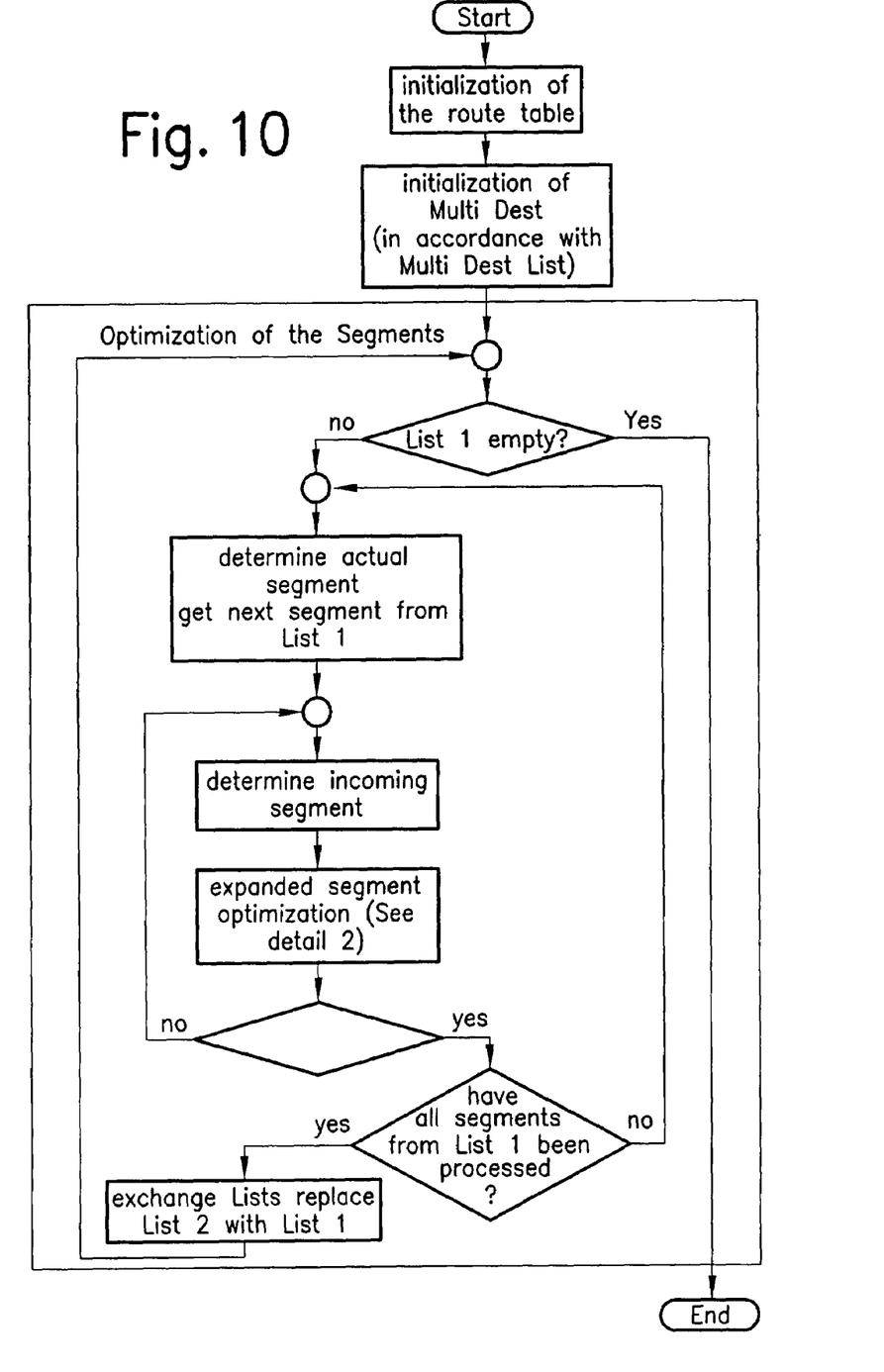
FIG. 10 shows an example flowchart of the method for optimizing the route of a route segment.

The flowchart for segment optimization from FIGS. 6 and 7 is shown again in detail in FIG. 10. Procedure D3 and L3 for optimizing the segments is carried out after the first initialization and the initialization of destination and route sections 16, 17. To this end, a final list (List 1) is initially provided, into which already optimized segments are entered. During the initialization of the destination, the destination segment is entered in this final segment. A second so-called optimization list (List 2) is used for storing the segments to be tested in the next optimization step. It is empty at the start of the optimization method. The segments specified in the final list are considered to be the imaginary, actual position of a vehicle, and all of the incoming segments interconnected with this actual segment are subjected to optimization for reasons of checking. Therefore, during the optimization of the segments, it is initially checked if the incoming list (List 1) is empty. When the final list is empty, the optimization of the segments is ended. Otherwise, the actual segment is determined, in that the next segment not yet considered is obtained from the final list (List 1). An incoming segment is determined for this actual segment, and the segment optimization already described in detail with regard to FIG. 9 is carried out. It is then checked if all of the incoming segments of the actual segments are processed. If all of the incoming segments have not yet been optimized, the next incoming segment is determined for the current actual segment, and segment optimization is also carried out for this. After all of the incoming segments have been processed, it is checked if all of the segments from the final list (List 1) have been processed. If all of the segments from the final list have not yet been processed, the next actual segment is determined, and the method is iteratively continued in this manner.

Each optimized incoming segment is introduced into the optimization list (List 2).

When all of the segments from the final list (List 1) have been processed, the final list (List 1) and the optimization list (List 2) are interchanged, so that the starting point for the next optimizations are those segments which have been optimized in the last step.

Since no more incoming segments are entered into the optimization list (List 2) during a run-through, when an optimum route is found, the method is terminated on the basis of the interchanged lists, when no more entries are in the final list (formerly the optimization list), that is, when there were no more optimized segments in the previous run-through.

Figure 11:
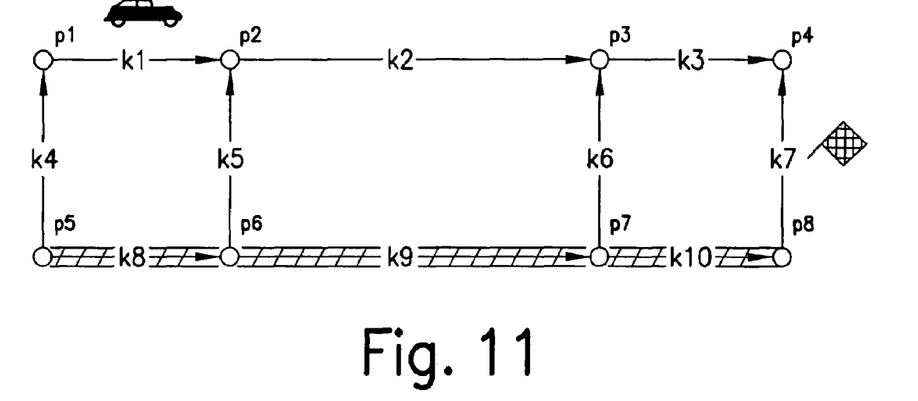
FIG. 11 shows a graphical diagram of an example traffic-route network, having a vehicle on a starting segment, and having a destination segment.
Figure 12:
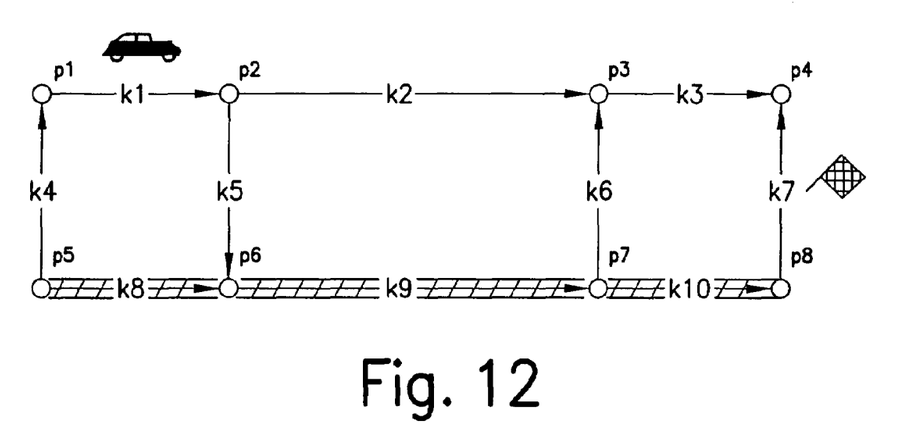
FIG. 12 shows the graphical diagram from FIG. 11, having an optimized route after a first optimization step.
Figure 13:
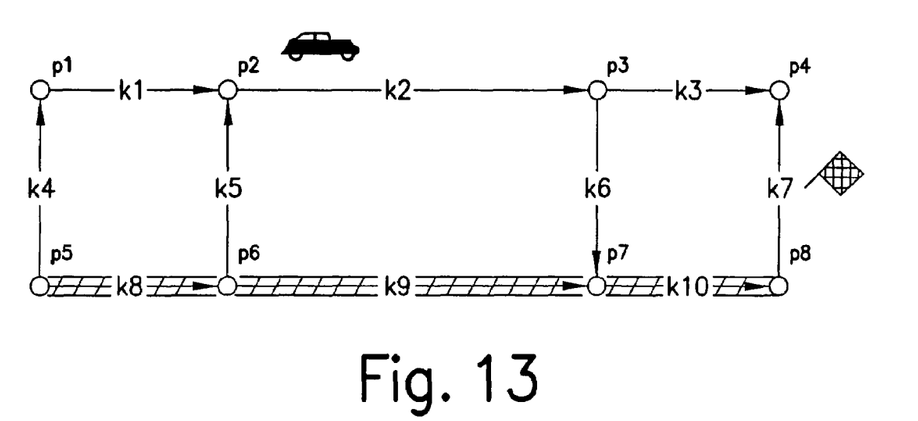
FIG. 13 shows the graphical diagram from FIG. 11, having an optimized route after a second optimization step.

This theoretically-described method of the present invention is now explained, using FIGS. 11 through 13 as an example.

FIG. 11 shows a traffic-route network having segments k1 through k10, nodes p1 through p8, and a set, fixed route section 15, which includes segments k8, k9, and k10 and is represented with hatching. A route from a starting point 13 to a destination 14 is determined (not shown in FIG. 11 but shown in FIGS. 12 and 13), which is optimal and mainly takes the fixed route section into account.

FIG. 12 also shows a graphic representation of the traffic-route network from FIG. 11, having a route from the starting point 13 to destination 14 that is optimized after the execution of the method of the present invention. The optimized route runs through segments k1, k5, k9, k10, and k7.

This optimized route was determined as follows, where, for the traffic route network, it is assumed that all of the segments have a resistance value of 10 with the exception of segments k2 and k9. Segments k2 and k9 have a resistance value of 20.

A passing list (PassList) is used for describing the fixed route section. In this list, all of the segments of the fixed route section are transferred to the route search unit. The passing list (PassList) contains the following entries for the example:

| segment |
|---------|
| +/−k8   |
| +/−k9   |
| +/−k10  |

In addition, for each route segment, a route table is generated, in which the characteristics of all the segments of the traffic-route network within considered route section 16, 17 of the route to destination 14 to be optimized are contained. For each segment, the total resistance and the segment resistance in both the direction of the arrow and the direction opposite the arrow are entered. In addition, the successor segment corresponding to each arrow direction is registered. Furthermore, a status identifier is provided for each segment, the status identifier indicating whether or not the segment belongs to a fixed route section.

First of all, the route table is initialized in a first step D1 for destination route segment 17, segment resistances $R^{Seg}$ and total resistances $R^{total}$ being set to "infinite". The successor segments are set to "undefined". Since segments k8, k9, and k10 belong to the fixed route section, the status identifier of these segments is set to Pass. The following table is generated for destination route segment 17, which is, however, also identical in step L1 for the initialization of the route table for starting route segment 16:

| Segment | Status | $+R^{Total}$ | $+R^{Seg}$ | +Successor | $-R^{Total}$ | $-R^{Seg}$ | −Successor |
|---------|--------|--------------|------------|------------|--------------|------------|------------|
| k1  | —    | ∞ | ∞ | — | ∞ | ∞ | — |
| k2  | —    | ∞ | ∞ | — | ∞ | ∞ | — |
| k3  | —    | ∞ | ∞ | — | ∞ | ∞ | — |
| k4  | —    | ∞ | ∞ | — | ∞ | ∞ | — |
| k5  | —    | ∞ | ∞ | — | ∞ | ∞ | — |
| k6  | —    | ∞ | ∞ | — | ∞ | ∞ | — |
| k7  | —    | ∞ | ∞ | — | ∞ | ∞ | — |
| k8  | Pass | ∞ | ∞ | — | ∞ | ∞ | — |
| k9  | Pass | ∞ | ∞ | — | ∞ | ∞ | — |
| k10 | Pass | ∞ | ∞ | — | ∞ | ∞ | — |

In a second step D2, the optimization for destination route segment 17 is initialized. In this connection, the segments from which the optimization begins are initialized. These are all of the segments of destination 14. The resistances in the route table become zero for these, and the designation, "destination", is input as a successor, so that the following table results:

| Seg-ment | Status | $+R^{Total}$ | $+R^{Seg}$ | +Successor | $-R^{Total}$ | $-R^{Seg}$ | -Successor |
|---|---|---|---|---|---|---|---|
| k1 | — | ∞ | ∞ | — | ∞ | ∞ | — |
| k2 | — | ∞ | ∞ | — | ∞ | ∞ | — |
| k3 | — | ∞ | ∞ | — | ∞ | ∞ | — |
| k4 | — | ∞ | ∞ | — | ∞ | ∞ | — |
| k5 | — | ∞ | ∞ | — | ∞ | ∞ | — |
| k6 | — | ∞ | ∞ | — | ∞ | ∞ | — |
| k7 | — | 0 | 0 | Destination | 0 | 0 | Destination |
| k8 | Pass | ∞ | ∞ | — | ∞ | ∞ | — |
| k9 | Pass | ∞ | ∞ | — | ∞ | ∞ | — |
| k10 | Pass | ∞ | ∞ | — | ∞ | ∞ | — |

These segments are introduced into the final list (List 1) of the segments to be optimized, which obtains, by this means, the following appearance.

The segments of the graph are optimized in a third step D3. The optimization of destination segment 17 is carried out for all of the optimization relationships, on the basis of the optimization rule described above in detail with reference to, in particular, FIG. 9. The following route table is generated after the complete, iterative optimization of the graph.

| Seg-ment | Status | $+R^{Total}$ | $+R^{Seg}$ | +Successor | $-R^{Total}$ | $-R^{Seg}$ | -Successor |
|---|---|---|---|---|---|---|---|
| k1 | — | 40 | 40 | +k2 | 50 | 50 | +k1 |
| k2 | — | 30 | 30 | +k3 | 50 | 50 | +k2 |
| k3 | — | 10 | 10 | -k7 | 20 | 20 | +k3 |
| k4 | — | 60 | 60 | +k1 | 60 | 60 | -k1 |
| k5 | — | 40 | 40 | +k2 | 40 | 40 | +k9 |
| k6 | — | 20 | 20 | +k3 | 20 | 20 | +k10 |
| k7 | — | 0 | 0 | Destination | 0 | 0 | Destination |
| k8 | Pass | 40 | 40 | +k9 | 50 | 50 | +k8 |
| k9 | Pass | 30 | 30 | +k10 | 50 | 50 | +k9 |
| k10 | Pass | 10 | 10 | +k7 | 20 | 20 | +k10 |

The segments of the fixed route section having status identifier "Pass" and having the lowest resistance to the destination may be ascertained from this route table. For this example, these include only segment +k10, which has a resistance of 10 and represents the starting point for calculating starting route segment 16.

The optimization of the starting route segment is carried out as follows:

The route table is initialized in a first step L1, as is already described with reference to step D1.

The optimization is initialized in a second step L2, whereby the segments, from which the optimization starts, must be initialized. For starting route segment 16, these are the segments of the fixed route section having status identifier "Pass" and the lowest resistance to the destination of destination route segment 17. For these segments, the resistance previously determined during the optimization of destination route segment 17 is entered into the route table, and the successor is appropriately indicated. Segment resistance $R^{Seg}$, based on the starting route segment, for all of the segments of the fixed route section is then set to zero, so that the route table has the following appearance:

| Seg-ment | Status | $+R^{Total}$ | $+R^{Seg}$ | +Successor | $-R^{Total}$ | $-R^{Seg}$ | -Successor |
|---|---|---|---|---|---|---|---|
| k1 | — | ∞ | ∞ | — | ∞ | ∞ | — |
| k2 | — | ∞ | ∞ | — | ∞ | ∞ | — |
| k3 | — | ∞ | ∞ | — | ∞ | ∞ | — |
| k4 | — | ∞ | ∞ | — | ∞ | ∞ | — |
| k5 | — | ∞ | ∞ | — | ∞ | ∞ | — |
| k6 | — | ∞ | ∞ | — | ∞ | ∞ | — |
| k7 | — | ∞ | ∞ | — | ∞ | ∞ | — |
| k8 | Pass | ∞ | 0 | — | ∞ | 0 | — |
| k9 | Pass | ∞ | 0 | — | ∞ | 0 | — |
| K10 | Pass | 10 | 0 | — | ∞ | 0 | — |

The above-determined segments of the fixed route section having the lowest resistance to the destination of destination route segment 17 are recorded in the final list (List 1) of the already optimized segments. The final list then has the following appearance:

The segments of the graph undergo expanded optimization in third step L3. In this connection, the optimization of the starting route segment 16 for all of the optimization relationships occurs on the basis of the optimization rules described in detail with reference to FIG. 9. The following route table is generated after the complete optimization of the graph:

| Seg-ment | Status | $+R^{Total}$ | $+R^{Seg}$ | +Successor | $-R^{Total}$ | $-R^{Seg}$ | -Successor |
|---|---|---|---|---|---|---|---|
| k1 | — | 50 | 20 | -k5 | 60 | 20 | -k4 |
| k2 | — | 40 | 30 | -k6 | 50 | 20 | -k5 |
| k3 | — | 40 | 20 | -k7 | 30 | 20 | -k6 |
| k4 | — | 60 | 20 | +k4 | 50 | 10 | +k8 |
| k5 | — | 50 | 20 | -k5 | 40 | 10 | +k9 |
| k6 | — | 30 | 20 | -k6 | 20 | 10 | +k10 |
| k7 | — | 40 | 20 | -k7 | 30 | 10 | -k10 |
| k8 | Pass | 40 | 0 | +k9 | 50 | 0 | +k8 |
| k9 | Pass | 30 | 0 | +k10 | 50 | 0 | +k9 |
| k10 | Pass | 10 | 0 | — | 20 | 0 | +k10 |

The route list, which is generated from the two route tables for starting route segment 16 and destination route segment 17, is compiled in the next step.

In this connection, starting out from the segment of the current vehicle position, in this case starting position 13, the segments are written into the route list in accordance with the successor interlinkage of starting segment 16 entered in the route table, until a successor is no longer present. The successor interlinkage of the destination route segment is then written into the route list, until destination segment k7 of destination 14 is reached. The optimized route is provided in tabular form in the route list as a result.

The route list has the following entries for the example:

| No. | Segment | +Resistance to Destination | Successor to Destination |
|---|---|---|---|
| 1 | +k1 | 50 | -k5 |
| 2 | -k5 | 40 | +k9 |
| 3 | +k9 | 30 | +k10 |

-continued

| No. | Segment | +Resistance to Destination | Successor to Destination |
|---|---|---|---|
| 4 | +k10 | 20 | +k7 |
| 5 | +k7 | 10 | |
| 6 | | 0 | |

In the exemplary traffic-route network, this route list appears as sketched in the graph of FIG. 12.

FIG. 13 shows an optimized route, after the vehicle has deviated from the optimized route outlined in FIG. 12. A new, optimized route is then found in accordance with the above-described method, the vehicle being led over segment k6 to segment k10 of the fixed route section.

Since the method is carried out in a reverse-iterating manner from a specific starting point, i.e., from a current vehicle position, and is not static, an optimum route from the current, actual position to the destination may be determined at any time, taking into consideration the usage of the fixed route section, without forcing the vehicle to turn around and leading it back on the optimum route determined earlier.

The different effects on the course of the route from fixing intermediate destinations and route areas (ViaAreas), as well as from fixing route sections in accordance with the present invention, are subsequently shown.

Figure 14:
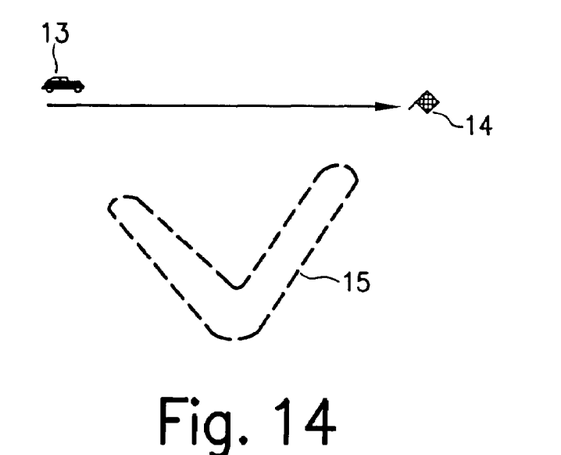
FIG. 14 shows a sketch of the positioning of an example route outside of a fixed route section.

FIG. 14 shows a normal route between a starting point 13 and a destination 14. This route runs directly from starting point 13 to destination 14 and is, therefore, optimally short but does not take fixed route section 15 into consideration.

Figure 15:
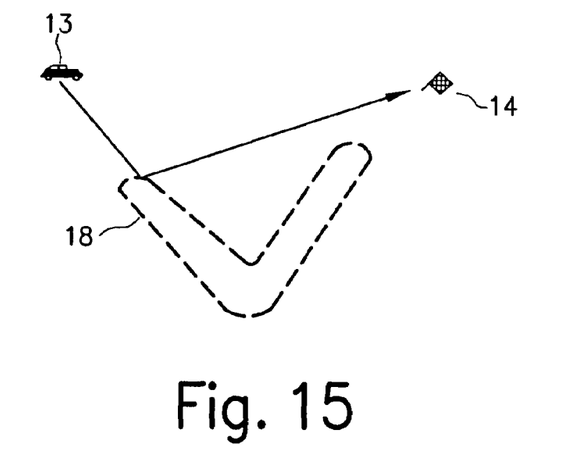
FIG. 15 shows a sketch of an example route that uses an intermediate destination in a fixed route section.

FIG. 15 shows a route that uses an intermediate destination 18, the route being the optimal one between starting point 13 and the edge of intermediate destination 18, regardless of the subsequent route section to the separate, actual destination. An attempt is made to reach the intermediate destination as rapidly or optimally as possible.

Figure 16:
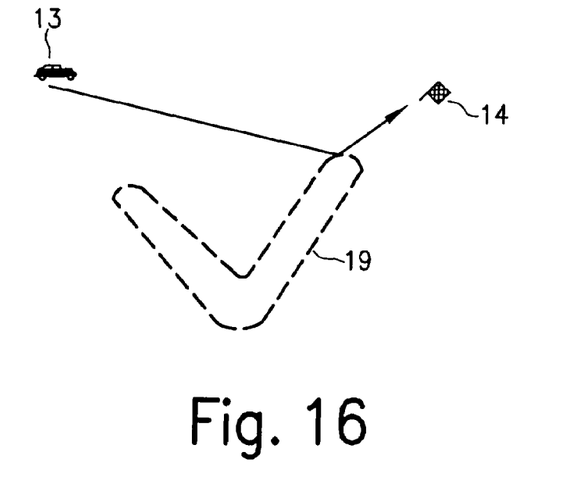
FIG. 16 shows a sketch of a route, using a route region.
Figure 17:
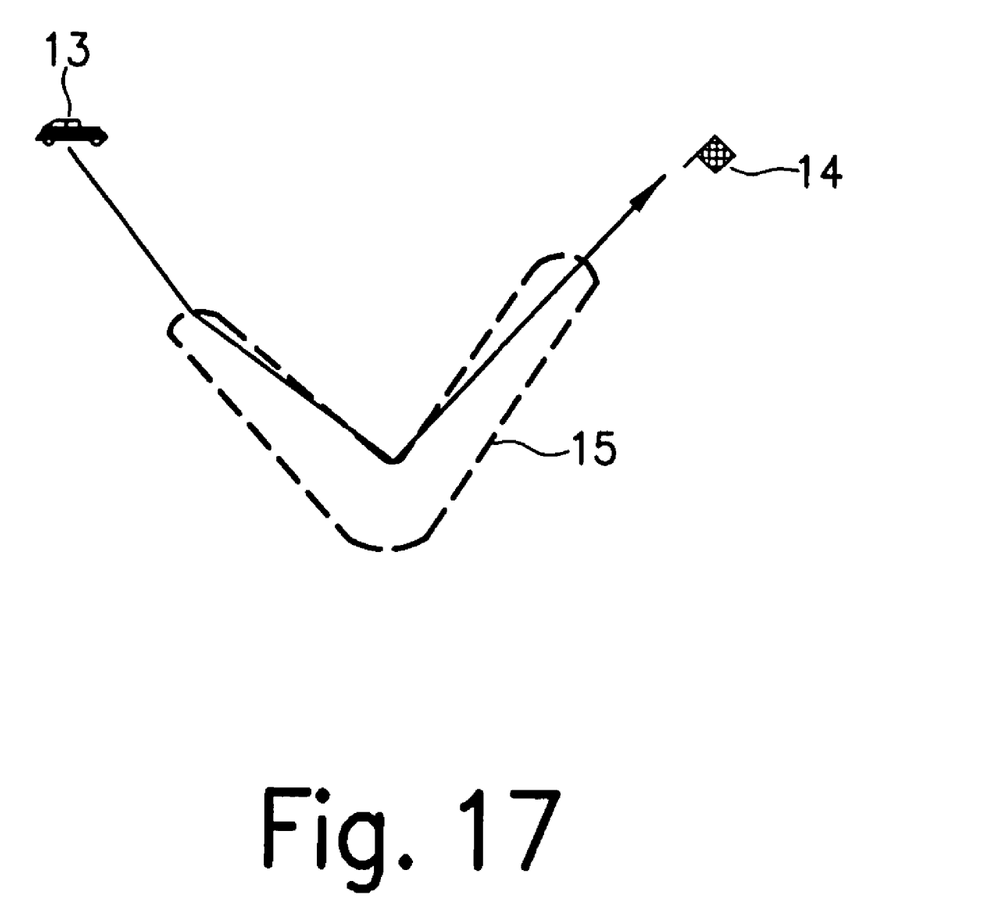
FIG. 17 shows an example route which uses a fixed route section and is optimized according to the method of the present invention.

FIG. 16 shows a route that uses a route area (ViaArea) 19, where none of the individual route sections is optimal by itself. Rather, the entire route is optimized. Fixed route area (ViaArea) 19 is indicated by a dotted line. While taking fixed route areas 19 into consideration in the optimization method, where and how much route area 19 is considered in the route is not particularly significant. However, FIG. 17 shows a route calculated according to the method of the present invention, using a fixed route section 15 marked by a dotted line. In this connection, two parts of the route are optimal, namely the route part between starting point 13 and fixed route section 15, as well as the route part between the fixed route section and destination 14. Between the entry point and exit point, the part of the route inside fixed route section 15 is also optimal again, by itself.

The entire route is optimized in this manner, it being ensured that the route runs through fixed route section 15 as much as possible.

The invention claimed is:

1. A method for automatically calculating an optimum route in a traffic-route network, taking into consideration a predefined route section that includes a plurality of segments linked to one another, the method comprising:

describing the traffic-route network by segments representing traffic-route sections, each segment being weighted with a respective resistance;

calculating a route from a starting segment to a destination segment, taking into consideration the predefined route section, initially optimizing a second portion of the route extending from the predefined traffic route section with respect to a favorable resistance to the destination segment so that the second portion of the route is yielded by a transition segment of the predefined route section to the destination segment;

optimizing a first portion of the route extending from a starting segment to the predefined route section for the least resistance to both the destination segment and the predefined route section, wherein an overall route is yielded from the first portion of the route and the second portion of the route from the starting segment via a part of the predefined route section, at least via the transition segment, to the destination segment;

dividing the route into at least two route portions including the first portion extending from the starting segment up to approximately the end of the predefined route section, and the second portion extending from approximately the end of the predefined route section up to the destination segment;

separately optimizing the first portion and the second portion; and determining the optimum route from the results of the optimization for the first portion and the second portion.

2. The method of claim 1, wherein a route for a starting route segment and for a destination route segment is defined as optimal for an incoming segment that is interconnected with a specific segment to be tested when one of:

i) a resistance of the route, defined as being currently optimal for the incoming segment, is less optimal than the resistance of a new route starting from the incoming segment, using an actual segment that was previously optimized; and ii) a resistance of the route, defined as currently optimal for the incoming segment, corresponds to the resistance of a new route starting from the incoming segment, using the actual segment, and the resistance of the route defined as being currently optimal for the incoming segment with reference to the entire route, is less optimal than a total resistance of the entire, new route starting from the incoming segment, using the actual segment.

3. The method of claim 2, wherein:

a) the second route portion is optimized first;

b) the first route portion is optimized subsequently; and c) the optimum route is determined from the results of the optimization of the first and second route portions.

4. The method of claim 2, further comprising:

initializing a route table for the first route portion and the second route portion, the route table having all possible segments of the traffic-route network for the route in the specific route segment, the initialization being such that each segment has one resistance per direction of a segment and each resistance includes a subsequent segment number;

wherein, for the initialization, the resistances are set to an extreme value and subsequent segments are set to undefined.

5. The method of claim 4, further comprising:

initializing original segments, from which the optimization is started, to optimize the route in the second route portion; and setting the resistance of the original segments in the route table to zero and setting corresponding successor segments to unavailable.

6. The method of claim 5, further comprising:
initializing original segments to optimize the first route portion, wherein starting segments of the destination segment having the lowest resistance up to the second route portion are provided as the original segments;
setting a total resistance of the original segments to the value determined during the optimization of the second route portion for the original segment; and
setting the resistances for the segments of the predefined route section to zero, with respect to the first route portion.

7. The method of claim 6, wherein the initialization is carried out at the start of the optimization of the first route portion and the second route portion.

8. The method of claim 4, wherein the route table includes a status identifier for each segment of the predefined route section.

9. The method of claim 4, further comprising:
saving optimized segments in a segment list.

10. The method of claim 1, wherein first partial routes are determined from all segments of the predefined route section to the destination segment in the initial optimizing of the second portion, and a partial route that is a first partial route whose resistance to the destination segment is the least is selected to be updated in a route table.

* * * * *